United States Patent
Sakai

[11] Patent Number: 6,080,079
[45] Date of Patent: Jun. 27, 2000

[54] TOROIDAL CONTINUOUSLY VARIABLE TRANSMISSION

[75] Inventor: Hiromasa Sakai, Kanagawa, Japan

[73] Assignee: Nissan Motor Co., Ltd, Yokohama, Japan

[21] Appl. No.: 09/359,797

[22] Filed: Jul. 26, 1999

[30] Foreign Application Priority Data

Jul. 28, 1998 [JP] Japan .................................. 10-212798

[51] Int. Cl.$^7$ ................................................ F16H 15/38
[52] U.S. Cl. .................................. 476/10; 476/2; 476/40; 477/37
[58] Field of Search .................................. 476/1, 2, 9, 10, 476/40, 42; 477/37, 46

[56] References Cited

U.S. PATENT DOCUMENTS

| | | | |
|---|---|---|---|
| 4,524,641 | 6/1985 | Greenwood | 74/691 |
| 4,662,248 | 5/1987 | Greenwood | 74/867 |
| 5,575,732 | 11/1996 | Inoue | 476/10 |
| 5,902,207 | 5/1999 | Sugihara | 476/10 |
| 5,935,039 | 8/1999 | Sakai et al. | 476/10 |
| 5,980,421 | 11/1999 | Machida et al. | 476/10 |

FOREIGN PATENT DOCUMENTS

| | | |
|---|---|---|
| 7-198015 | 8/1995 | Japan . |
| 10-73152 | 3/1998 | Japan . |
| 2 312 258 | 10/1997 | United Kingdom . |
| 2 318 161 | 4/1998 | United Kingdom . |

*Primary Examiner*—David M. Fenstermacher
*Attorney, Agent, or Firm*—Foley & Lardner

[57] ABSTRACT

First oil chambers (80A) which drive a toroidal continuously variable transmission in a speed ratio decrease direction are connected to a first port (82B) of an oil pressure control valve (62) via a first passage (86A). Second oil chambers (80B) which drive the toroidal continuously variable transmission in a speed ratio increase direction are connected to a second port (82C) via a second passage (86B). The oil pressure control valve (62) selectively connects a pump port (82A, 82F, 82G) and a drain pot (82D, 82E, 82H) to the first and second ports (82B, 82C) according to the displacement of a spool (84). A damper (96, 98, 102, 108, 109, 114, 116, 120) is connected to one of the ports so as to exert a damping action on the oil passing through the oil pressure control valve (62).

7 Claims, 12 Drawing Sheets

TOROIDAL CONTINUOUSLY VARIABLE TRANSMISSION

FIELD OF THE INVENTION

This invention relates to a speed ratio control of a toroidal continuously variable transmission for a vehicle.

BACKGROUND OF THE INVENTION

A toroidal continuously variable transmission for a vehicle continuously varies a speed ratio according to a variation of a gyration angle of power rollers gripped by an input disk and an output disk. Tokkai Hei 7-198015 published by the Japanese Patent Office in 1995 discloses an oil pressure mechanism for varying the gyration angle of the power rollers. The oil pressure mechanism comprises a spool type oil pressure control valve driven by a step motor, and a feedback mechanism which feeds back the gyration angle of one of the power rollers to the oil pressure control valve via a precess cam and an L-shaped link.

When the oil pressure control valve is operated via the step motor, an oil pressure supplied to the continuously variable transmission from the oil pressure control valve varies, and the gyration angle of the power roller varies. This variation is fed back to the oil pressure control valve via the feedback mechanism, and the gyration angle of the power roller is controlled to a target gyration angle by stopping rotation of the step motor when the real gyration angle of the power roller coincides with the target gyration angle.

One end of the L-shaped link of the feedback mechanism is in contact with the precess cam, and the other end is connected to a rod joined to the spool of the oil pressure valve so that the displacement of the precess cam in the axial direction and rotation direction is transmitted to the spool.

The spool is pushed towards the L-shaped link by a spring housed in the oil pressure control valve so as to maintain this contact state.

SUMMARY OF THE INVENTION

If an operation is performed which causes a large variation of the speed ratio, a large amount of oil flows in the pressure control valve, and therefore a large oil pressure acts on the spool. If the variation of the oil pressure is large, the occurrence of an unpredictable spool movement in a transient state also increases. Increase of the spring load of the aforesaid spool supporting spring as well as the increase of drive force of the step motor are effective in suppression of the unpredictable spool movement in the transient state. However, such an arrangement increases the cost of the step motor.

It is therefore an object of this invention to reduce the internal pressure of an oil pressure control valve supplying an oil pressure to a continuously variable transmission.

In order to achieve the above object, this invention provides a toroidal continuously variable transmission comprising an input disk and output disk coaxially disposed facing each other, plural power rollers gripped between the disks, plural trunnions respectively supporting the power rollers, and plural pistons respectively fixed to the trunnions. The pistons vary a speed ratio of an input disk and output disk by displacing the power rollers via the trunnions, The transmission further comprises plural first oil chambers that respectively apply an oil pressure to the plural pistons in a decreasing direction of the speed ratio, plural second oil chambers that respectively apply an oil pressure to the plural pistons in an increasing direction of the speed ratio, and an oil pressure control valve comprising a pump port connected to an oil pressure source, a drain port connected to a drain, a first port connected to the plural first oil chambers, a second port connected to the plural second oil chambers, and a spool for selectively connecting either one of said pump port and said drain port to one of said first port and said second port according to a displacement thereof. The transmission further comprises a feedback member that feeds back a displacement amount of any of the trunnions to the spool, and a damper that passes the whole amount of oil through any one of the first port, second port, pump port and drain port, thereby generating a pressure loss in the oil so as to reduce a force exerted by the oil on the spool.

The details as well as other features and advantages of this invention are set forth in the remainder of the specification and are shown in the accompanying drawings.

DESCRIPTION OF THE PREFERRED EMBODIMENTS

Figure 1:
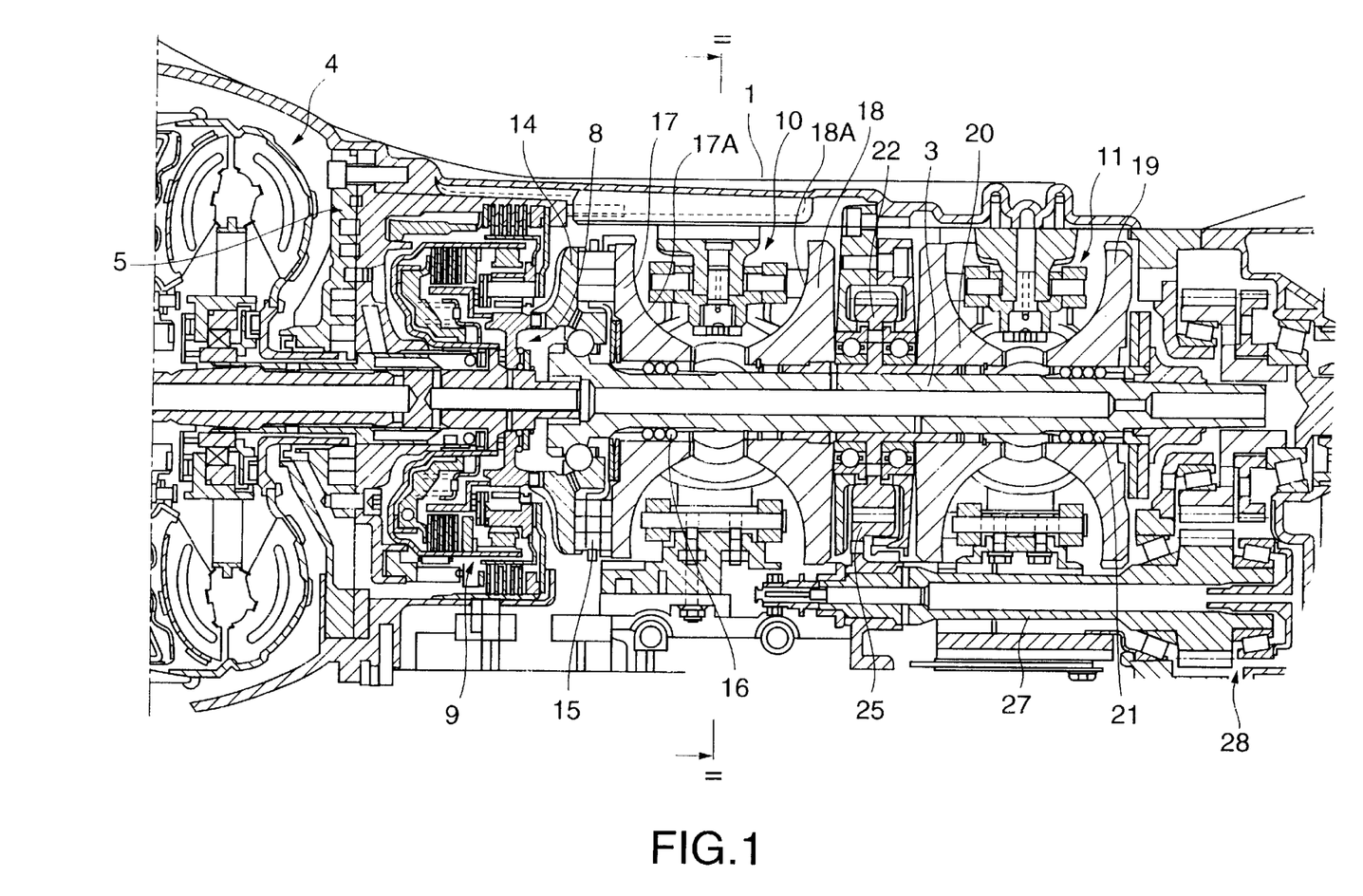
FIG. 1 is a longitudinal sectional view of a toroidal continuously variable transmission according to this invention.

Referring to FIG. 1 of the drawings, a toroidal continuously variable transmission is provided with first and second toroidal units 10, 11 arranged in series in a transmission case.

The rotation of an engine is transmitted to a cam flange 14 via a torque converter 4, oil pump 5, and forward/reverse change over mechanism 9.

The rotation of the cam flange 14 is transmitted to an input disk 17 of the first toroidal unit 10 via cam rollers 15.

The input disk 17 is joined to the input disk 19 of the second toroidal unit 11 via a rotation shaft 3. These input discs 17, 19 are respectively connected to the rotation shaft 3 via ball splines 16, 21, and are permitted to perform a displacement in an axial direction along the rotation shaft 3 while their rotation relative to the rotation shaft 3 is locked.

The cam rollers 15 give a thrust load according to the rotational movement of the cam flange 14 with respect to the input discs 17, 19, and push the input discs 17, 19 toward the output discs 18, 20 which respectively face the input discs 17, 19. The output discs 18, 20 are free to rotate on the outer circumference of the rotation shaft 3.

Figure 2:
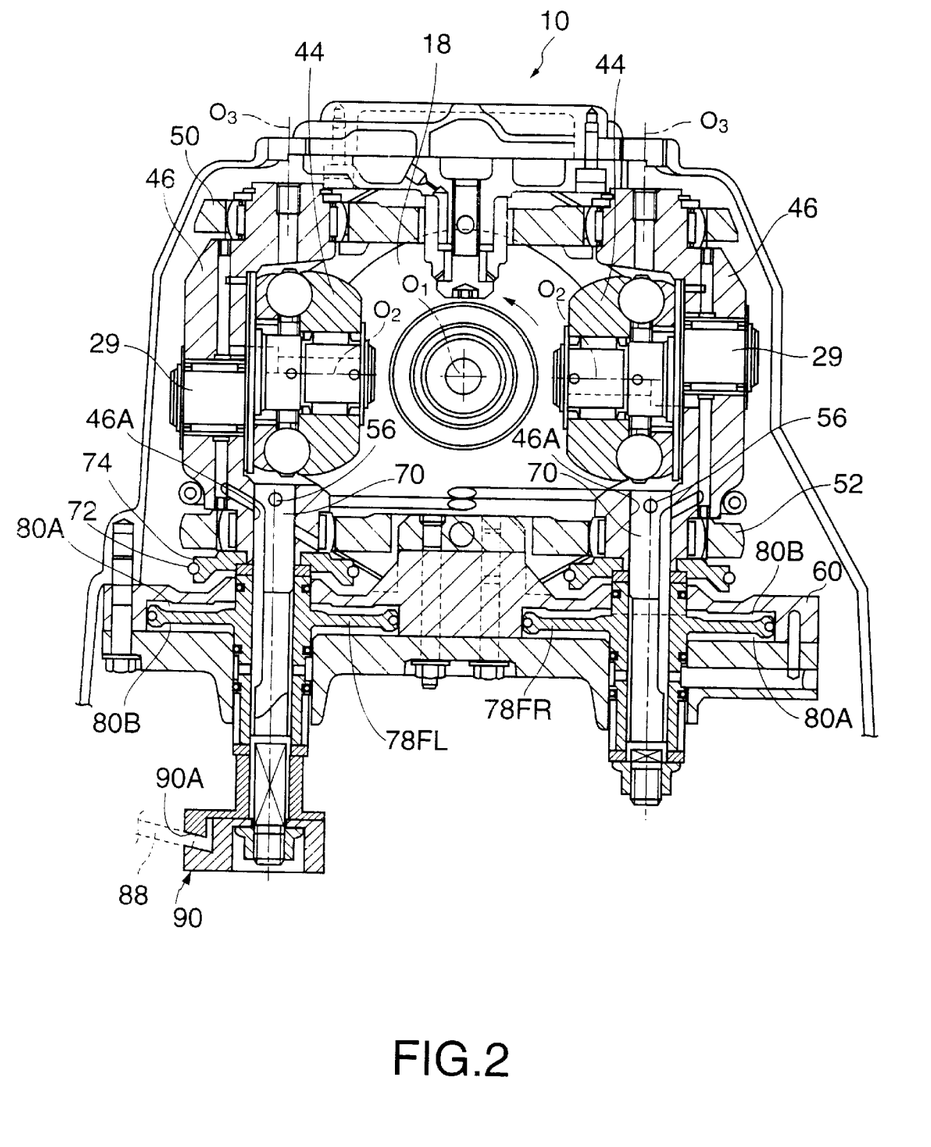
FIG. 2 is a cross-sectional view of the toroidal continuously variable transmission taken along a line II—II in FIG. 1.

The input disk 17 and output disk 18 which form the first toroidal unit 10 have toroidal wall surfaces 17A, 18A facing each other, and a pair of power rollers 44 is gripped by the wall surfaces 17A, 18A due to the aforementioned thrust load, as shown in FIG. 2. Identical power rollers are gripped between the input disk 19 and output disk 20 of the second toroidal unit 11. The rotation of the input discs 17, 19 is transmitted to the output discs 18, 20 via these power rollers 44. The rotation of the output discs 18, 20 is transmitted to an output shaft, not shown, via an output gear 22, gear 25, countershaft 27 and gear 28.

The contact points of the input disk 17(19) and output disk 18(20) with the power rollers 44 vary according to the gyration angle of the power rollers 44 around an axis $O_3$ of FIG. 2, and the ratio of rotation speeds of the input disk 17(19) and output disk 18(20) is determined according to the distances from the contact points of the input and output discs 17, 18(19, 20) with the power rollers 44 to a rotation axis $O_1$ of the rotation shaft 3. This rotation speed ratio of the input and output discs 17, 18(19, 20) is the speed ratio of the transmission.

Next, the detailed construction of the parts of the toroidal units will be described referring to FIG. 2. Hereafter, the description will refer to the first toroidal unit 10, but it will be understood that the basic construction of the second toroidal unit 11 is identical to that of the first toroidal unit 11 unless otherwise specified.

Each toroidal unit comprises a pair of trunnions 46 to support the power rollers 44. The power rollers 44 are supported via a crank shaped eccentric shaft 29 on each trunnion 46. The eccentric shaft 29 comprises a base end supported free to rotate on the trunnion 46 and a tip bent in a crank shape. Each of the power rollers 44 is supported free to rotate around a rotation axis $O_2$ due to this tip. Further, each of the power rollers 44 is permitted to pivot around the base end within predetermined limits.

The upper parts of the trunnions are connected by an upper link 50 via a spherical joint. The lower parts of the trunnions 46 are connected by a lower link 52 via a spherical joint. In the lower part of the trunnion 46, a shaft hole 46A is formed, and a trunnion shaft 70 is joined to the trunnion 46 by a pin 56 inserted into in this shaft hole 46A from underneath.

A pulley 74 is fixed to the outer circumference of the lower part of the trunnion 46. The rotational displacements of each trunnion 46 are synchronized by looping a wire 72 around this pulley 74.

A piston 78FR(78FL) is fixed to each of the trunnion shafts 70. The piston 78FR(78FL) displaces the trunnion 46 along the axis $O_3$ according to an oil pressure balance of oil chambers 80A, 80B which are formed above and under the piston 78 in a piston case 60. Oil pressure is supplied to these oil chambers 80A, 80B from an oil pressure control valve 62 shown in FIG. 4.

Figure 4:
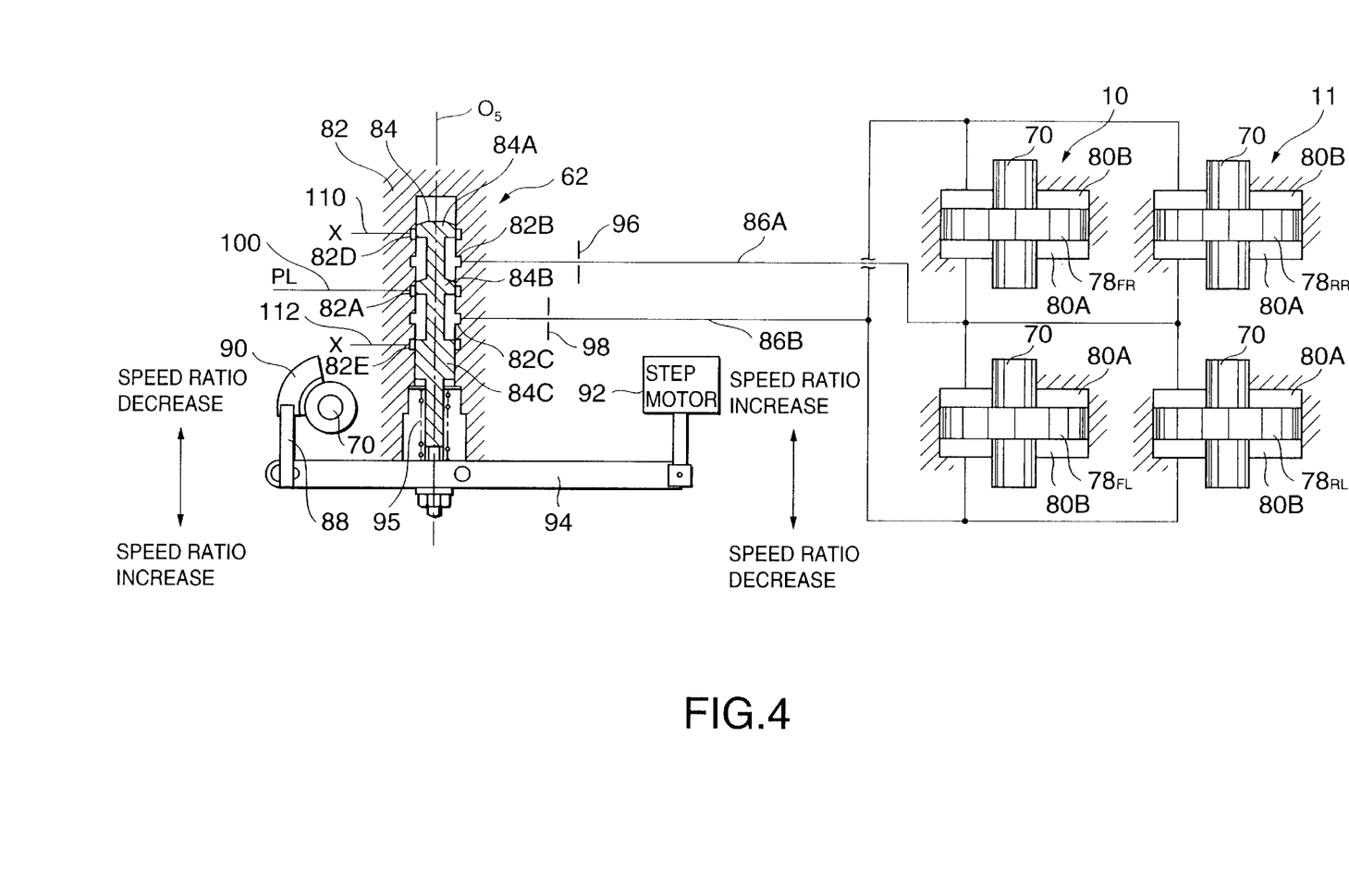
FIG. 4 is a schematic diagram of an oil pressure circuit of the toroidal continuously variable transmission, according to this invention.

The oil pressure control valve 62 comprises a spool 84 accommodated free to slide in the direction of an axis $O_5$ in the valve body 82.

The pump port 82A, first port 82B, second port 82C, and drain ports 82D, 82E are formed in the valve body 82. A predetermined line pressure PL is supplied from an oil pressure pump, not shown, to the pump port 82A via a high pressure passage 100. Drain passages 110, 112 are connected to the drain ports 82D, 82E.

A first land 84A, second land 84B and third land 84C are formed in the spool 84 at predetermined intervals in the direction of the axis $O_5$.

Referring again to FIG. 2, a precess cam 90 is fixed to the lower part of the trunnion shaft 70 of a trunnion 46 shown in the left of the figure. The precess cam 90 comprises a groove 90A formed in a spiral around the axis $O_3$, and the linear displacement in the direction of the axis $O_3$ and rotational displacement around the axis $O_3$ of this trunnion 46 is transmitted to a link 88 whereof one end engages with this groove 90A.

Figure 3:
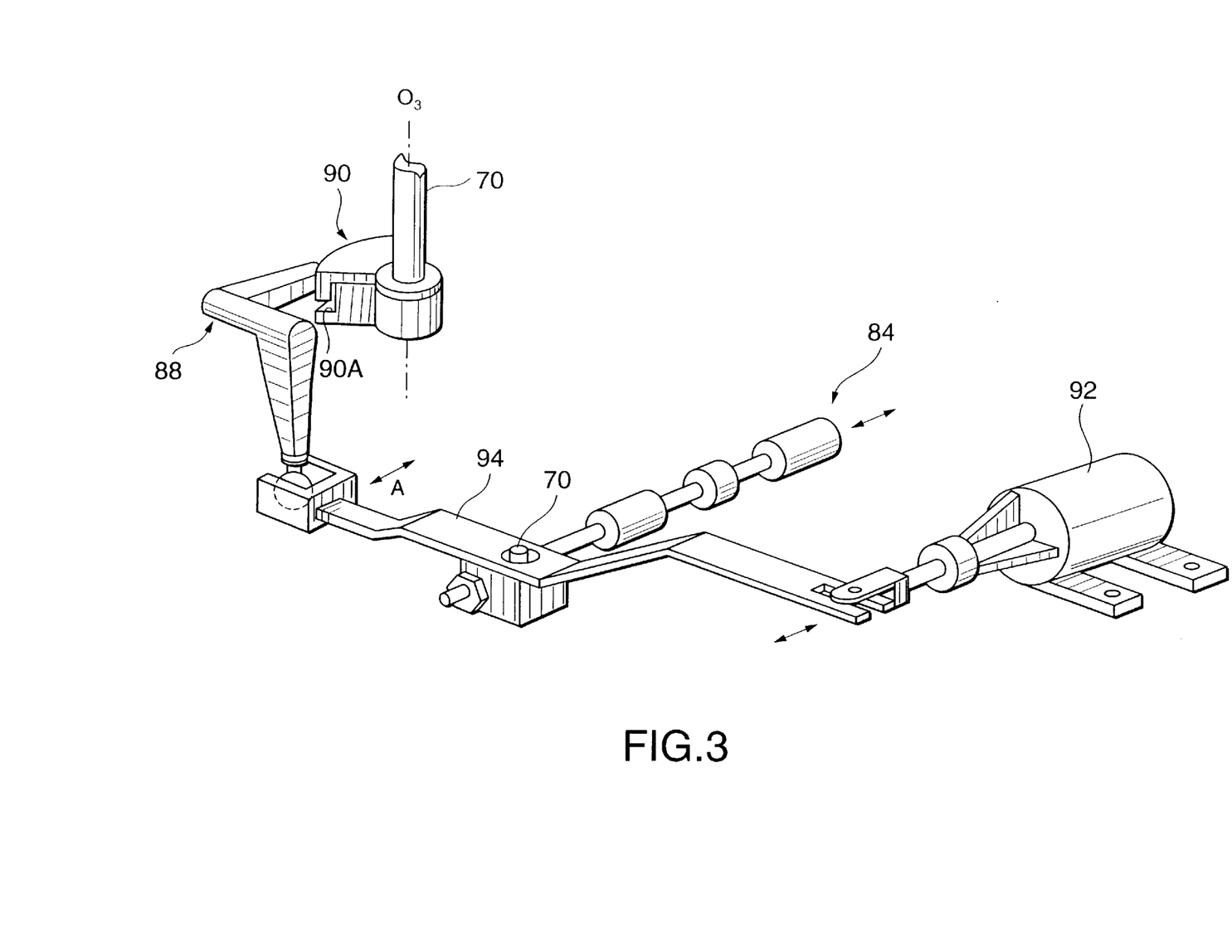
FIG. 3 is a perspective view of a feedback mechanism according to this invention.

Referring to FIG. 3, the other end of the link 88 is connected to one end of a lever 94. The other end of the lever 94 is connected to a step motor 92, and an middle part of the lever 94 is connected to the spool 84 of the oil pressure control valve 62. Due to the linear displacement in the direction of the axis $O_3$ and rotational displacement around the shaft $O_3$ of the trunnion shaft 70, the lever 94 displaces in the direction of the arrow A in the drawing.

Referring again to FIG. 4, a coil spring 95 which pushes the lever 94 in the speed ratio increase direction is disposed in the valve body 82 of the oil pressure control valve 62.

The first port 82B of the oil pressure control valve 62 is connected to a first oil passage 86B. A first oil passage 86A is connected with an oil chamber 80A below the piston 78FR and an oil chamber 80A above the piston 78FL of the first toroidal unit 10, and an oil chamber 80A below a piston 78RR and an oil chamber 80A above a piston 78RL of the second toroidal unit 11, via plural branch oil passages. These oil chambers 80A all apply a pressure to the corresponding piston so as to drive the trunnions in the speed ratio decrease direction.

A second port 82C is connected to a second oil passage 86B. The second oil passage 86B is connected with an oil chamber 80B above the piston 78FR and an oil chamber 80B below the piston 78FL of the first toroidal unit 10, and an oil chamber 80B above the piston 78RR and an oil chamber 80B below the piston 78RL of the second toroidal unit 11, via plural branch oil passages. These oil chambers 80B all apply a pressure to the corresponding piston so as to drive the trunnions in the speed ratio increase direction.

An orifice 96 is provided in the first oil passage 86A. The orifice 96 is provided in such a position that the whole quantity of oil discharged from the first port 82B passes through it, i.e., at a position nearer to the first port 82B than the branch points of any of the branch passages.

An orifice 98 is provided in the second oil passage 86B. The orifice 98 is provided in such a position that the whole quantity of oil flowing into the second port 82C should pass through it, i.e., at a position nearer to the second port 82C than the branch points of any of the branch passages.

In FIG. 4, the spool 84 of the oil pressure control valve 62 is located in a neutral position. At this position, the pump port 82A, and drain ports 82D, 82E are respectively closed by the lands 84A–84C of the spool 84, and the first port 82B and second port 82C are not connected to either the pump or the drain. Hence, inflow and outflow of oil into and out of the oil chambers 80A, 80B, are shut off.

When the step motor 92 drives the lever 94 from this state in the speed ratio decrease direction designated by the right arrow in FIG. 4, the spool 84 displaces to the lower side of the drawing via the lever 94. The step motor 92 drives the lever 94 according to a target speed ratio signal output by a controller, not shown.

Due to this operation, the pump port 82A and first port 82B are connected, and the drain port 82E and second port 82C are connected.

As a result, high pressure oil is supplied from the first port 82B to the oil chambers 80A via the first passage 86A, and the oil chambers 80B are discharged to the drain via the second passage 86B and second port 82C. The pistons 78FR–78RL respectively displace the trunnion along the axis $O_3$ due to the pressure difference of the oil chambers 80A, 80B, and the power rollers and the trunnions supporting them rotate around each axis $O_3$. Due to this motion, the gyration angle of the power rollers varies, and the continuously variable transmission decreases the speed ratio. As a result, the output rotating speed of the continuously variable transmission increases.

The linear displacement in the direction of the axis $O_3$ and rotation around the axis $O_3$ of one of the trunnions 46 are transmitted to the lever 94 via the precess cam 90 and link 88, and the lever 94 displaces in the speed ratio decrease direction designated by the left arrow in FIG. 4. The position of the lever 94 after this displacement corresponds to the real speed ratio of the continuously variable transmission. The direction of displacement is the reverse of that caused by the spool 84. When the target speed ratio commanded by the controller to the step motor 92 coincides with the real speed ratio fed back to the spool 84 via the link 88, i.e., when the real speed ratio coincides with the target speed ratio, the spool 84 returns to the neutral position. Inflow and outflow of the oil of the oil chambers 80A, 80B is therefore again shut off, and the speed ratio of the continuously variable transmission is maintained at the target speed ratio output from the controller to the step motor 92.

When on the other hand the step motor 92 drives the lever in the speed ratio increase direction of the arrow, the spool 84 displaces to the upper part of the drawing via the lever 94. The first port 82B is thereby connected with the drain port 82D, and the second port 82C is connected with the pump port 82A.

As a result, high pressure oil is supplied to the oil chamber 80B, and the oil chambers 80A is discharged to the drain. The pistons 78FR–78RL displace the trunnions along each axis $O_3$ respectively due to the pressure difference between the oil chambers 80B, 80A, and the power rollers and trunnions supporting them therefore rotate around each axis $O_3$. The direction of this displacement is the reverse of the above mentioned case where the lever 94 is driven in the speed ratio decrease direction.

Therefore, the gyration angle of the power rollers varies in a direction which increases the speed ratio, and the continuously variable transmission decreases the output rotation speed.

On the other hand, the linear displacement in the direction of the axis $O_3$ and the rotational displacement around the axis $O_3$ of one of the trunnions 46 are fed back to the spool 84 of the oil pressure control valve 62 via the precess cam 90, link 88 and lever 94, and the spool 84 displaces to the lower part of the drawing.

The direction of this displacement is the reverse of the displacement that the step motor 94 causes the lever 94 to make, and as a result, when the target speed ratio coincides with the real speed ratio, the spool 84 returns to the neutral position. Due to this motion, inflow and outflow of oil into and out of the oil chambers 80A, 80B is again shut off, and the speed ratio of the continuously variable transmission is maintained at the target speed ratio output to the step motor 92.

If the step motor 92 rapidly drives the lever 94 in the speed ratio decrease direction, or in other words, if the pump port 82A and first port 82B are rapidly connected, and the drain port 82E and second port 82C are rapidly connected, a rapid flow of oil is set up between the pump port 82A and first port 82B, and between the second port 82C and drain port 82E.

However, in this continuously variable transmission, as the orifices 96, 98 were provided in the first passage 86A and second passage 86B respectively, a sudden rise in the flowrate of oil in the oil pressure control valve 62 is suppressed, and the variation of the oil pressure in the valve is also limited within a considerably small range.

Next, the effect of these orifices 96, 98 will be described in detail.

The force F which is exerted on the spool 84 when oil flows through the oil pressure control valve 62 is expressed by the following equation (1).

$$F = \rho \cdot Q \cdot V \cdot \cos\theta \tag{1}$$

where, p=density of oil,
Q=oil flowrate in oil pressure control,
V=oil velocity in oil pressure control valve, and
θ=spray flow angle of oil.

The oil flowrate Q in the oil pressure control valve 62 is expressed by the following equation (2).

$$Q = C \cdot Av \cdot \sqrt{\frac{2 \cdot Pv}{\rho}} \tag{2}$$

where, C=flowrate coefficient of oil pressure control valve,

Av=oil flow minimum cross-sectional area in oil pressure control valve, and

Pv=pressure loss of oil pressure control valve.

Further, the pressure loss ΔP of an orifice when it is provided in a passage in the vicinity of the oil pressure control valve 62 is given by the following equation (3).

$$\Delta P = \frac{\rho}{2 \cdot C_0^2 \cdot A_0^2} \cdot Q^2 \quad (3)$$

where, $C_0$=flowrate coefficient of orifice, and $A_0$=opening cross-sectional area of orifice.

Figure 12:
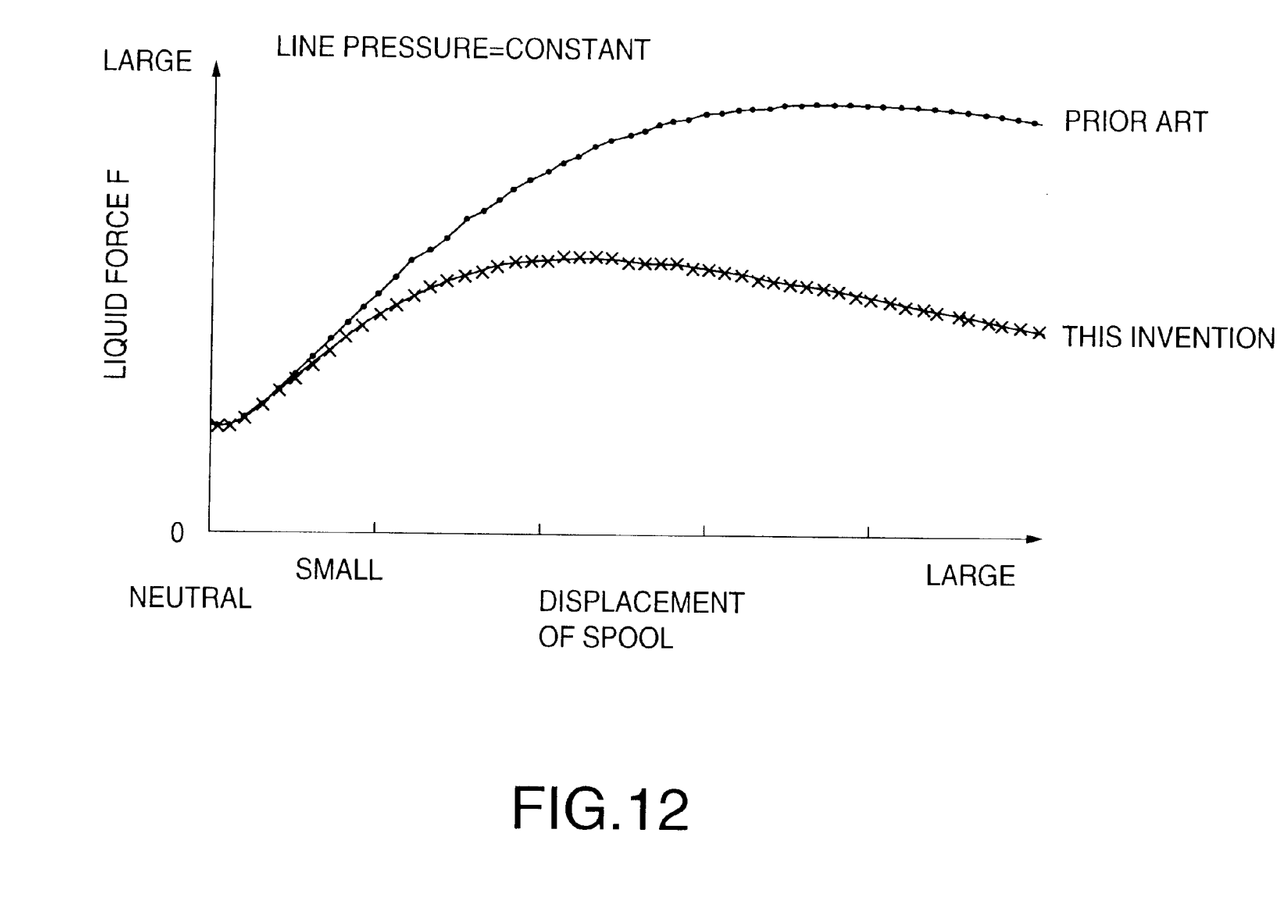
FIG. 12 is a diagram explaining the internal pressure of an oil pressure control valve according to this invention in comparison with the internal pressure of an oil pressure control valve according to a prior art.

In other words, a pressure loss in the whole flowpath from the oil pressure control valve 62 to the oil chambers 80A, 80B is increased by providing the orifices 96, 98. Therefore, a sudden increase of oil flowrate is suppressed due to a pressure loss of the orifices 96, 98 generated outside the oil pressure control valve 62, and this is true even if the pump port 82A and first port 82B, and drain port 82E and second port 82C, are respectively momentarily connected. Also, due to the provision of the orifices 96, 98, the proportion represented by the pressure loss of the oil pressure control valve 62 in the pressure loss of the whole flowpath, falls. Therefore, if the pressure loss of the whole flowpath is set to be the same, i.e., the supply pressure PL to the pump port 82A is the same, the oil pressure circuit of this invention comprising the orifice largely decreases the magnitude of the force F acting on the spool 84 compared to the oil pressure circuit not comprising the orifice according to the prior art, as shown in FIG. 12.

As a result, the spring load of the coil spring 95 of the oil pressure control valve 62 and the capacity of the step motor 92 can be set small.

According to the aforesaid embodiment, the orifice was provided in the first passage 86A and second passage 86B, but it may be provided in another position as in the following second-eighth embodiments provided that it passes whole amount of oil through any port of the oil pressure control valve 62.

Figure 5:
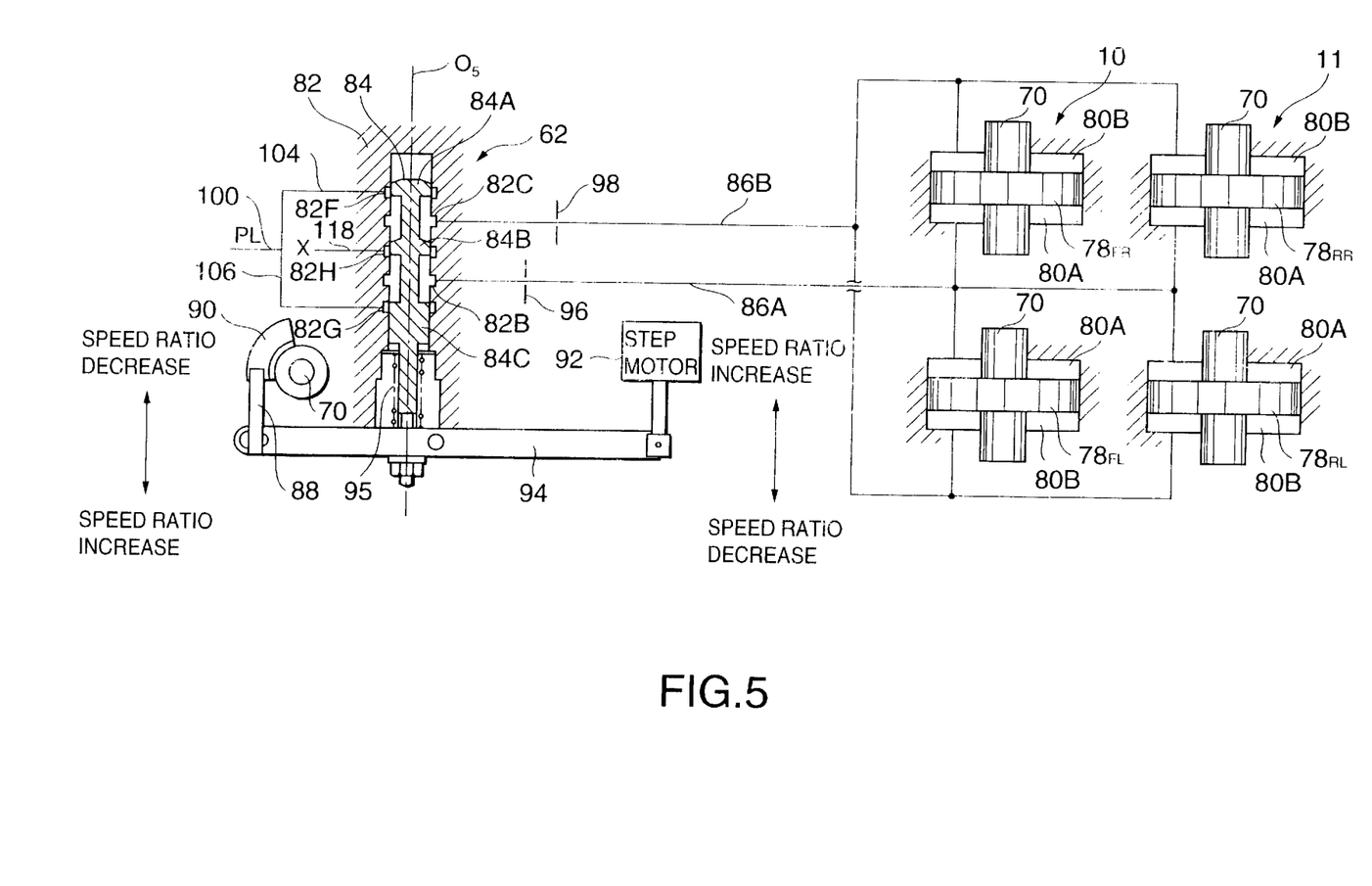
FIG. 5 is similar to FIG. 4, but showing a second embodiment of this invention.

The second embodiment of this invention shown in FIG. 5 relates to the disposition of the port of the oil pressure control valve 62.

According to this embodiment, two pump ports 82F, 82G are provided in the oil pressure control valve 62, and one drain port 82H is provided between them. Branch passages 104, 106 which branch off from the high pressure passage 100 are connected to the pump ports 82F, 82G. A drain 118 is connected to the drain port 82H. The second oil passage 86B is connected to the first port 82B, and the first oil passage 86A is connected to the second port 82C.

According also to this embodiment, the oil pressure in the oil pressure control valve 62 is reduced by the orifices 96, 98 as in the aforesaid first embodiment.

Figure 6:
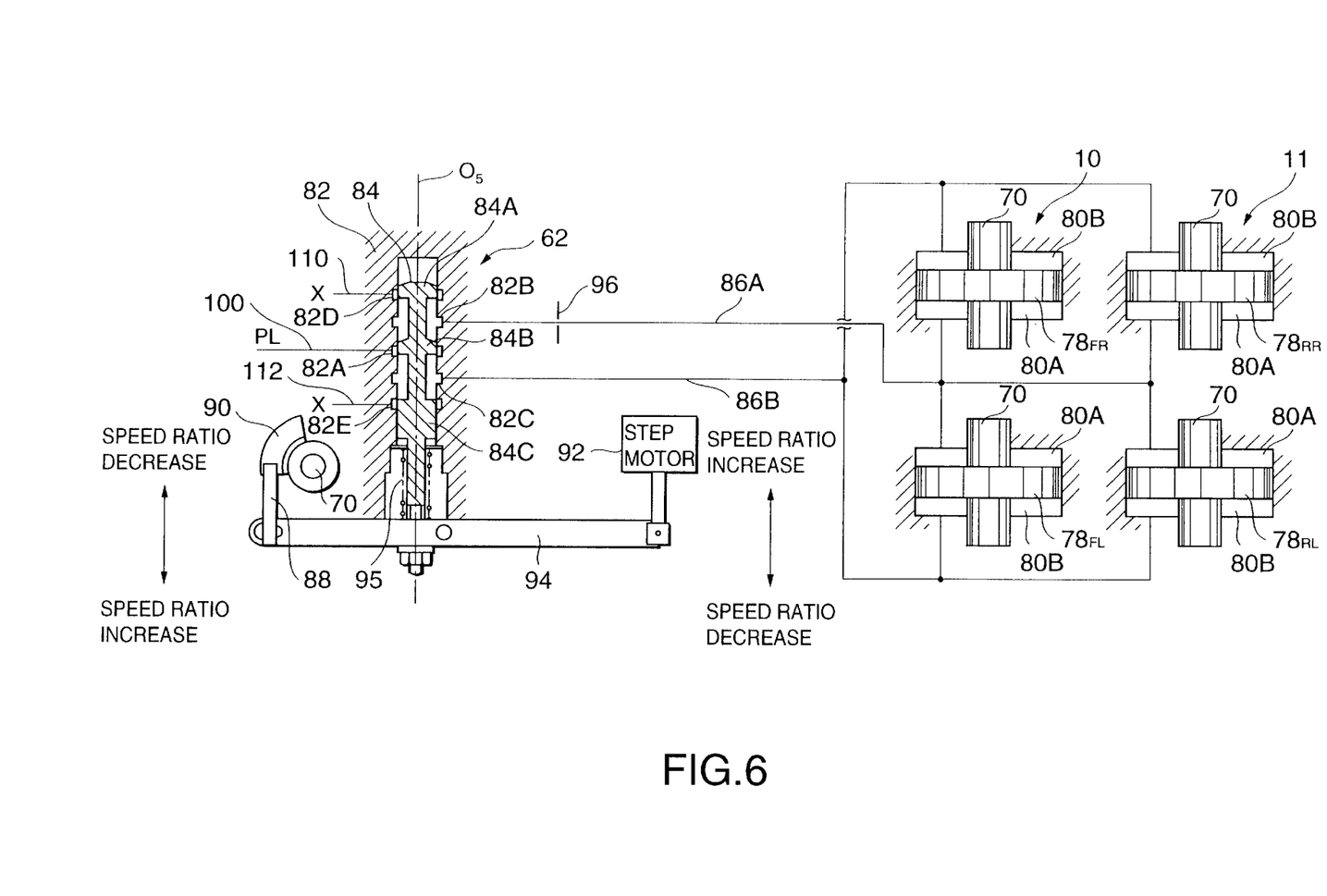
FIG. 6 is similar to FIG. 4, but showing a third embodiment of this invention.

In the third embodiment of this invention shown in FIG. 6, considering that an identical amount of oil always flows in the reverse direction in the first oil passage 86A and second oil passage 86B, the orifice 96 in the first oil passage 86A is provided but the orifice in the second oil passage 86B is omitted.

According to this embodiment, as the number of orifices is reduced, the cost is reduced and the design is simplified. Alternatively, the orifice 96 in the first oil passage 86A may be omitted and the orifice 98 in the second oil passage 86B may be provided.

Figure 7:
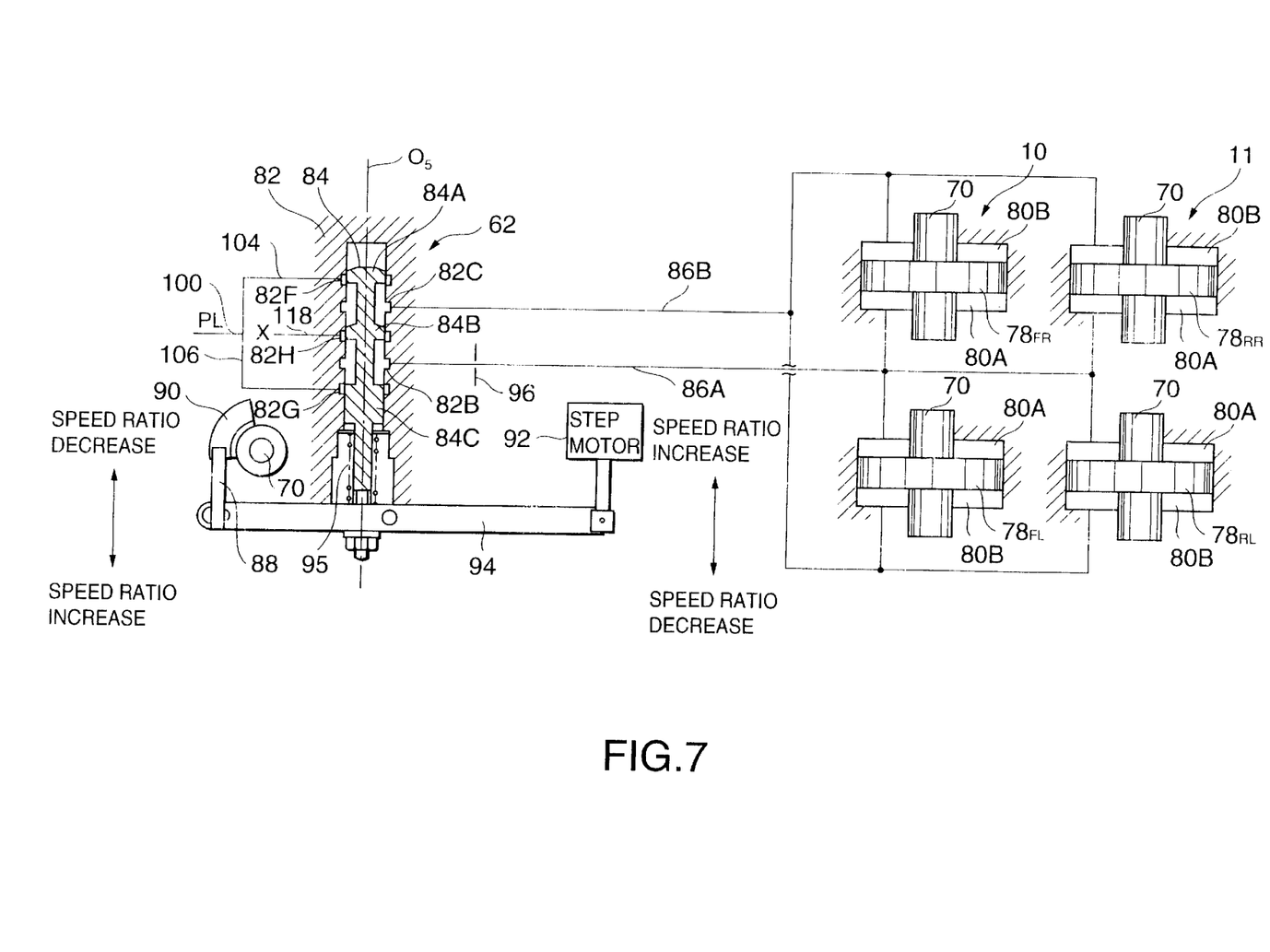
FIG. 7 is similar to FIG. 4, but showing a fourth embodiment of this invention.

In the fourth embodiment of this invention shown in FIG. 7, the oil flowpath is identical to that of the second embodiment, and the orifice 96 in the first oil passage 86A is provided while the orifice 98 in the second oil passage 86B is omitted. Alternatively, the orifice 98 in the second oil passage 86B may be provided and the orifice 96 in the first oil passage 86A may be omitted.

Figure 8:
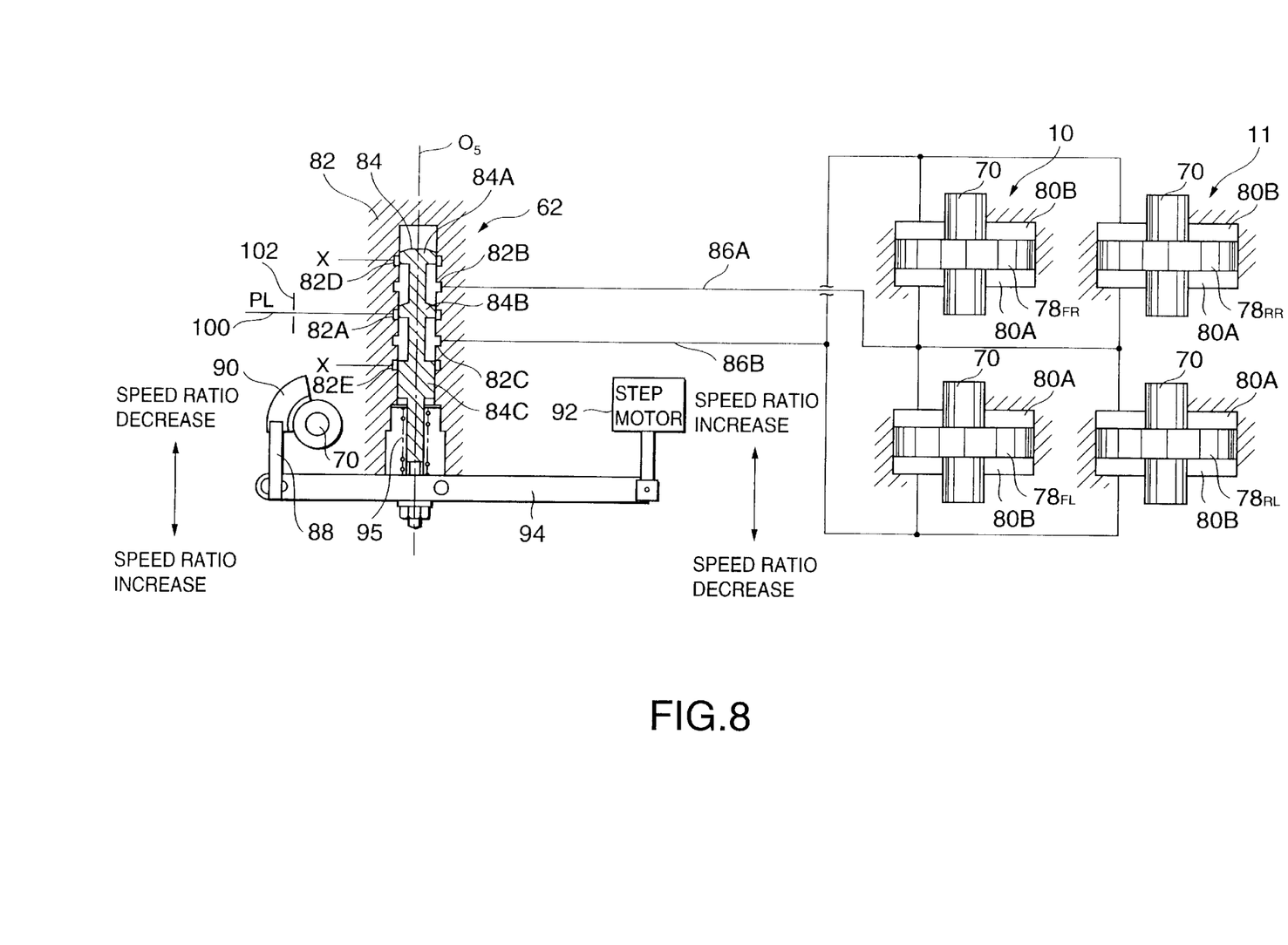
FIG. 8 is similar to FIG. 4, but showing a fifth embodiment of this invention.

In the fifth embodiment of this invention shown in FIG. 8, the oil flowpath is identical to that of the first embodiment, and an orifice 102 is provided in the high pressure passage 100 instead of providing an orifice in the first oil passage 86A or the second oil passage 86.

According also to this embodiment, the orifice 102 causes a pressure loss relative to the oil flowing into the oil pressure control valve 62 from the high pressure passage 100, so the oil flowrate in the oil pressure control valve 62 falls, and the oil pressure acting on the spool 84 decreases.

Figure 9:
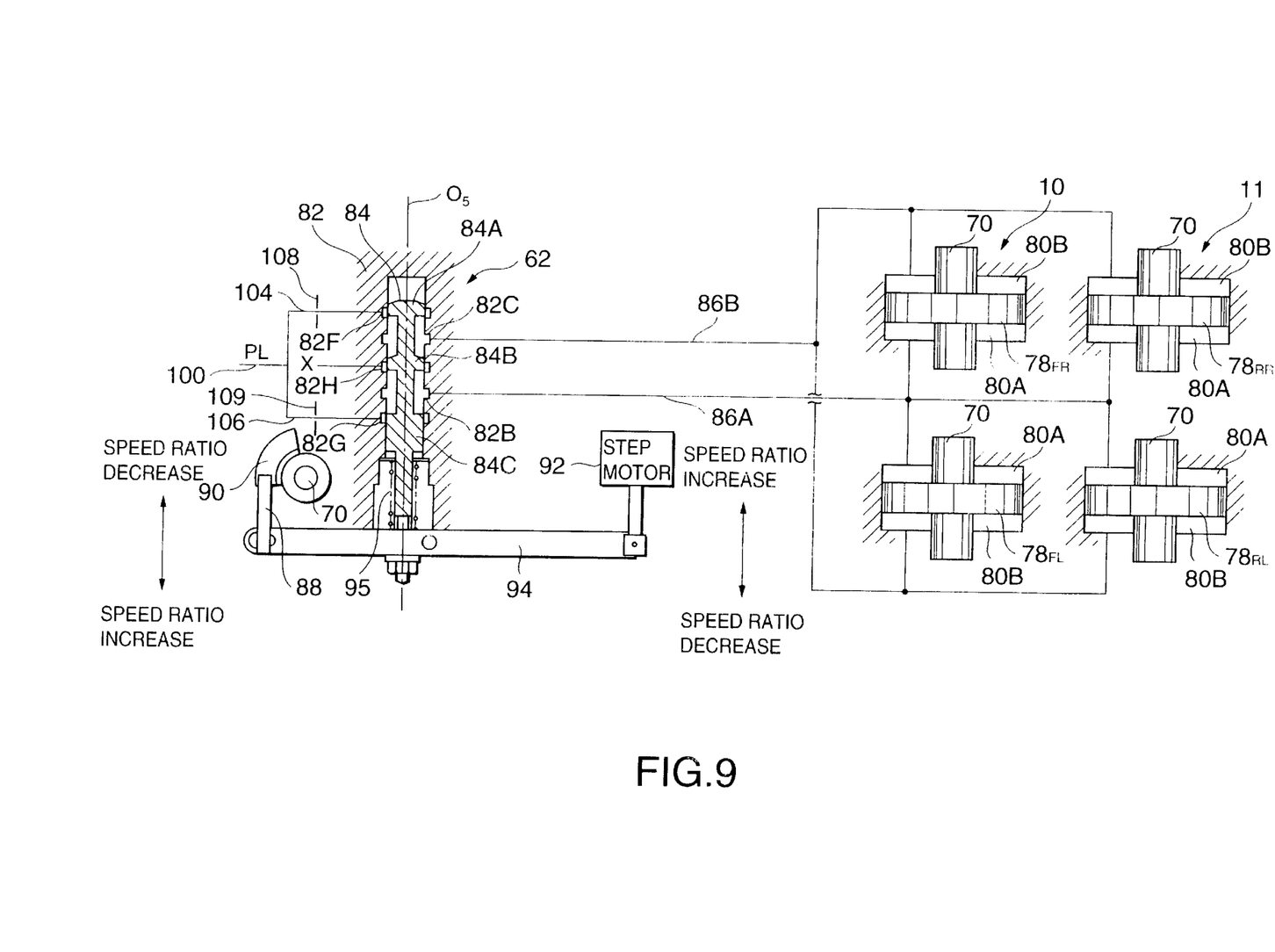
FIG. 9 is similar to FIG. 4, but showing a sixth embodiment of this invention.

In the sixth embodiment of this invention shown in FIG. 9, the oil flowpath is identical to that of the second embodiment, and orifices 108, 109 are respectively provided in the branch passages 104, 106 branching off from the high pressure passage 100 and leading to the pump ports 82F, 82G.

According to this embodiment, the same effect is obtained as in the fifth embodiment.

Figure 10:
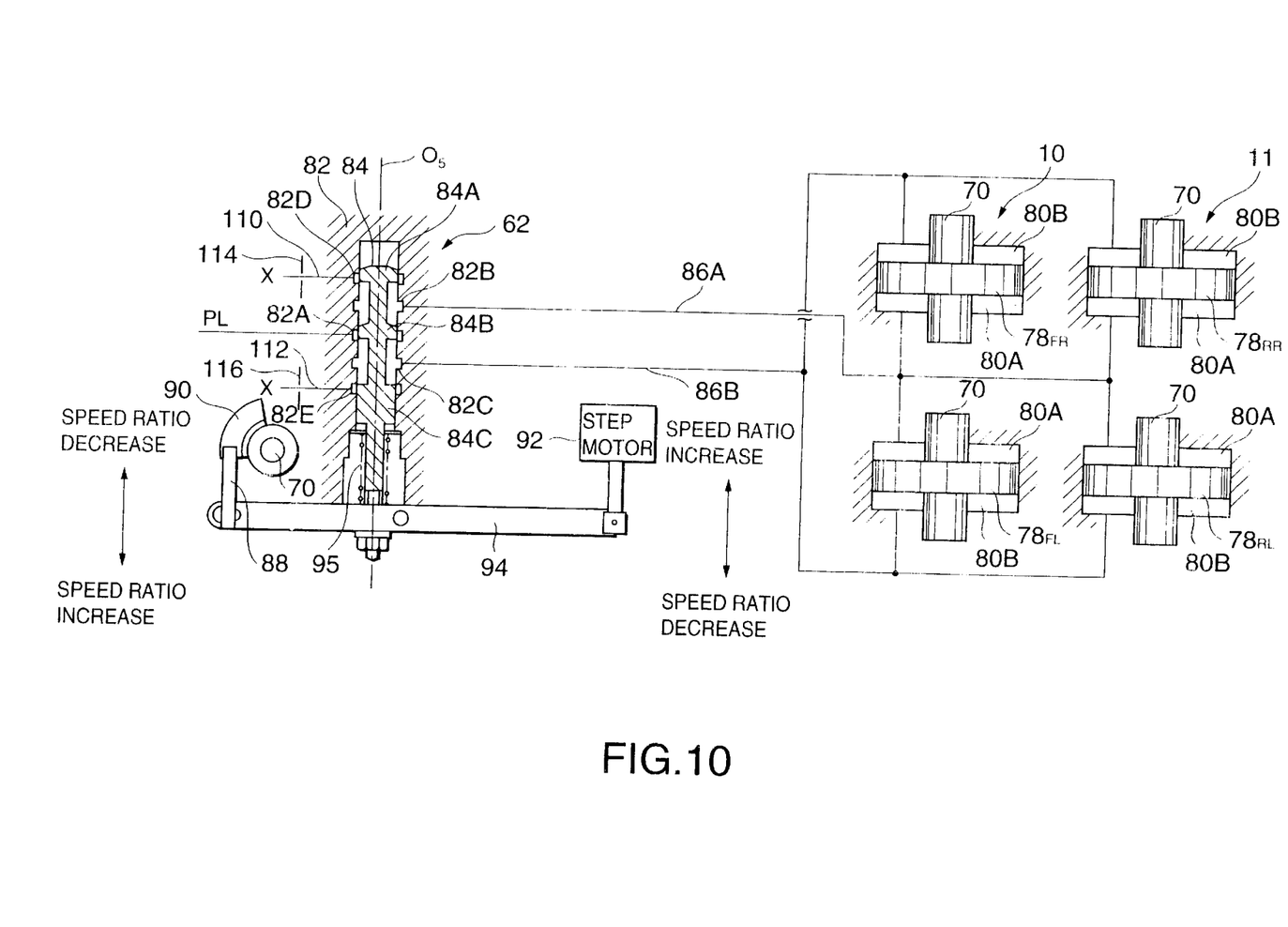
FIG. 10 is similar to FIG. 4 but showing a seventh embodiment of this invention.

In the seventh embodiment of this invention shown in FIG. 10, the oil flowpath is identical to that of the first embodiment, and orifices 114, 116 are provided in drains 110, 112 connected to the drain ports 82D, 82E instead of providing an orifice in the first oil passage 86A or second oil passage 86B. If oil passes through the oil pressure control valve 62, oil flows out from either the drain port 82D or 82E, so the oil pressure in the oil pressure control valve 62 can be reduced by providing orifices in the drains 114, 116 in this way.

Figure 11:
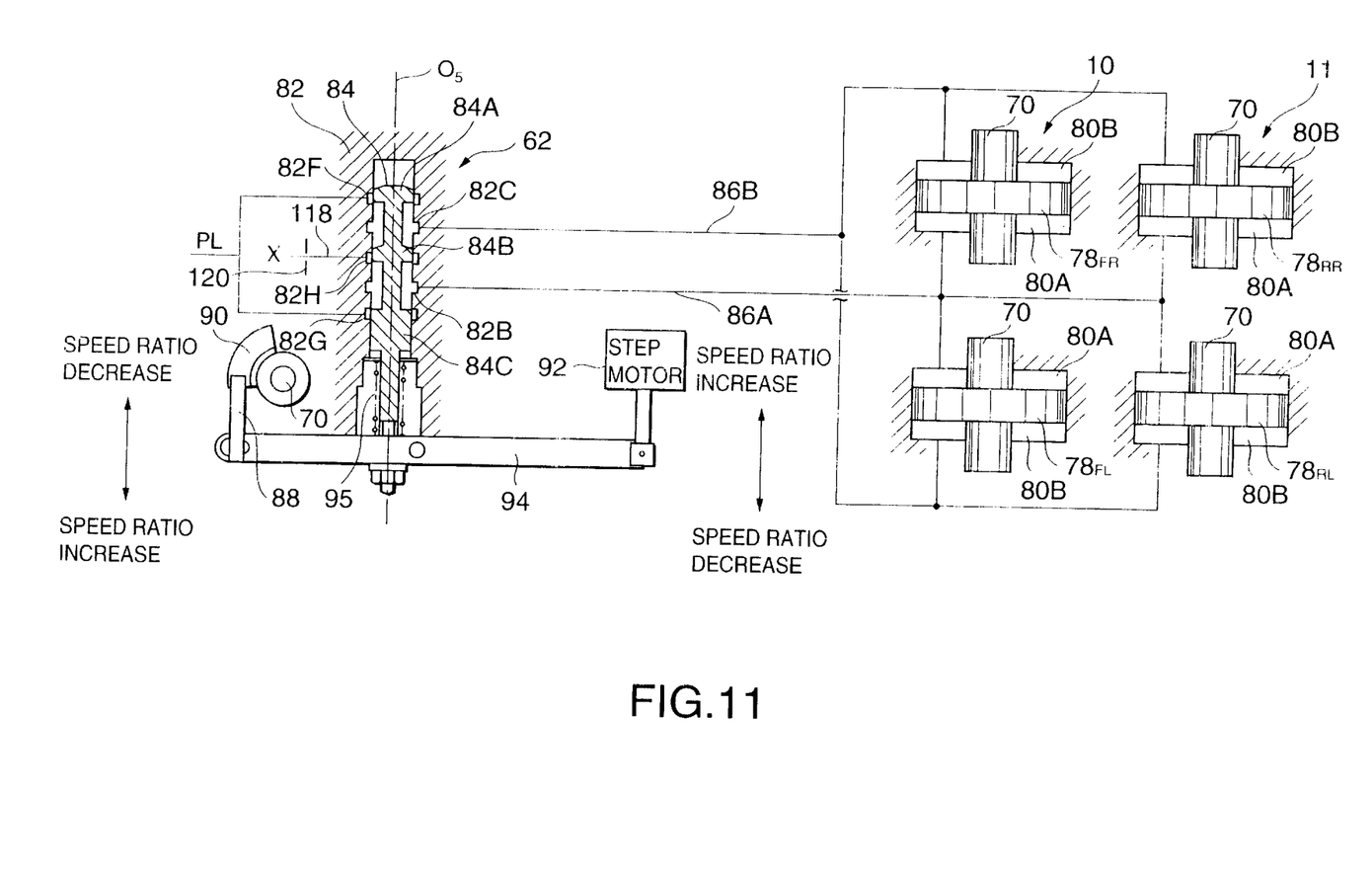
FIG. 11 is similar to FIG. 4, but showing an eighth embodiment of this invention.

In the eighth embodiment of this invention shown in FIG. 11, the oil flowpath is identical to that of the second embodiment, and an orifice 120 is provided in a drain 118 connected to the drain port 82H. According to this embodiment also, the same effect is obtained as in the seventh embodiment.

The contents of Tokugan Hei 10-212798 with a filing date of Jul. 28, 1998 in Japan, are hereby incorporated by reference.

Although the invention has been described above by reference to certain embodiments of the invention, the invention is not limited to the embodiments described above. Modifications and variations of the embodiments described above will occur to those skilled in the art, in light of the above teachings.

For example, in the aforesaid embodiments, an orifice is used as damping elements to generate pressure losses, but it will be understood that a member having an identical effect such as, for example, a choke, may be used instead of an orifice.

The embodiments of this invention in which an exclusive property or privilege is claimed are defined as follows:

What is claimed is:

1. A toroidal continuously variable transmission comprising:

an input disk and output disk coaxially disposed facing each other;

plural power rollers gripped between said disks;

plural trunnions respectively supporting said power rollers;

plural pistons respectively fixed to said trunnions, said pistons varying a speed ratio of an input disk and output disk by displacing said power rollers via said trunnions;

plural first oil chambers that respectively apply an oil pressure to said plural pistons in a decreasing direction of said speed ratio;

plural second oil chambers that respectively apply an oil pressure to said plural pistons in an increasing direction of said speed ratio;

an oil pressure control valve comprising a pump port connected to an oil pressure source, a drain port connected to a drain, a first port connected to said plural first oil chambers, a second port connected to said plural second oil chambers, and a spool for selectively connecting either one of said pump port and said drain port to one of said first port and said second port according to a displacement thereof;

a feedback member that feeds back a displacement amount of any of said trunnions to said spool; and a damper that passes the whole amount of oil through any one of said first port, second port, pump port and drain port, thereby generating a pressure loss in said oil so as to reduce a force exerted by said oil on said spool.

2. A toroidal continuously variable transmission as defined in claim 1, wherein said damper comprises an orifice.

3. A toroidal continuously variable transmission as defined in claim 2, wherein said orifice comprises an orifice connected to said first port.

4. A toroidal continuously variable transmission as defined in claim 2, wherein said orifice comprises an orifice connected to said second port.

5. A toroidal continuously variable transmission as defined in claim 2, wherein said orifice comprises a first orifice connected to said first port and a second orifice connected to said second port.

6. A toroidal continuously variable transmission as defined in claim 2, wherein said orifice comprises an orifice connected to said pump port.

7. A toroidal continuously variable transmission as defined in claim 2, wherein said orifice comprises an orifice connected to said drain port.

* * * * *